US005988398A

United States Patent [19]

Gerteis

[11] Patent Number: 5,988,398

[45] Date of Patent: Nov. 23, 1999

[54] INVERTABLE FILTER CENTRIFUGE

[75] Inventor: Hans Gerteis, Bietigheim-Bissingen, Germany

[73] Assignee: Heinkel Industriezentrifugen GmbH & Co., Bietigheim-Bissingen, Germany

[21] Appl. No.: 09/105,778

[22] Filed: Jun. 26, 1998

Related U.S. Application Data

[63] Continuation of application No. PCT/EP97/05804, Oct. 21, 1997.

[30] Foreign Application Priority Data

Nov. 8, 1996 [DE] Germany ........................... 196 46 038

[51] Int. Cl.[6] .................................................. B01D 33/067

[52] U.S. Cl. ......................... 210/370; 210/380.3; 494/41; 494/83

[58] Field of Search .................................... 210/370, 232, 210/380.3; 494/41, 83

[56] References Cited

U.S. PATENT DOCUMENTS

| | | | |
|---|---|---|---|
| 3,880,346 | 4/1975 | Hopfe . | |
| 5,004,540 | 4/1991 | Hendricks | 210/370 |
| 5,092,995 | 3/1992 | Gerteis . | |

FOREIGN PATENT DOCUMENTS

| | | |
|---|---|---|
| 1097909 | 1/1961 | Germany . |
| 3430506 | 2/1986 | Germany . |
| 8331079 | 2/1986 | Germany . |
| 4417310 | 11/1995 | Germany . |

*Primary Examiner*—David A. Reifsnyder
*Attorney, Agent, or Firm*—Leydig, Voit & Mayer, Ltd.

[57] ABSTRACT

An invertable filter centrifuge for separating liquid-solids mixtures comprises a rotatingly driven centrifugal drum, an invertable filter cloth arranged on the centrifugal drum, a filtrate housing for receiving and discharging the liquid filtrate separated from the liquid-solids mixture by means of centrifugation with a filter cloth turned inwards into the centrifugal drum, a solids housing for receiving and discharging the solids (filter cake) separated from the liquid-solids mixture during further rotation of the centrifugal drum with a filter cloth turned outwards and an annular gap surrounding the edge of the centrifugal drum in the region of the filtrate housing and the solids housing. Protection means are provided on the invertable filter centrifuge, with the aid of which a flow of a gaseous blocking medium can be generated in the annular gap surrounding the edge of the drum, this flow preventing any undesired transfer of gaseous, liquid and/or solid substances between filtrate housing and solids housing.

14 Claims, 6 Drawing Sheets

INVERTABLE FILTER CENTRIFUGE

The present application is a continuation of International Patent Application No. PCT/EP97/05804, filed Oct. 21, 1997, designating the United States, the entire specification of which is incorporated herein by reference.

The invention relates to an invertable filter centrifuge for separating liquid-solids mixtures comprising a rotatingly driven centrifugal drum, an invertable filter cloth arranged on the centrifugal drum, a filtrate housing for receiving and discharging the liquid filtrate separated from the liquid-solids mixture by means of centrifugation with a filter cloth turned inwards into the centrifugal drum, a solids housing for receiving and discharging the solids (filter cake) separated from the liquid-solids mixture during further rotation of the centrifugal drum with a filter cloth turned outwards and an annular gap surrounding the edge of the centrifugal drum in the region of the filtrate housing and the solids housing.

An invertable filter centrifuge of this type is known from DE-37 40 411 A1.

In order to achieve as great a separating effect as possible during operation with such a centrifuge, the centrifugal drum is mostly driven at the highest possible rotational speed, which leads to very high circumferential speeds at the edge of the drum. Since, in the case of these centrifuges, wobbling movements of the centrifugal drum occur on account of unavoidable imbalances, an annular gap has so far been provided between the rotating centrifugal drum and the stationary housing in the region of filtrate and solids chambers and this gap can also contain a flexible, elastic seal (DE-34 30 506 C2). When the centrifugal drum is caused to rotate rapidly within such an annular gap, the annular gap must be at least of such a size that the wobbling movement of the drum resulting at maximum imbalance does not lead to any contact of the rotating centrifugal drum with stationary housing parts. When using a seal in the annular gap, this may abut only slightly on rotating machine parts as a result of the considerable circumferential speed of the centrifugal drum and the heat development occurring during touching.

This annular gap which is necessary with regard to the wobbling movements of the drum leads to the fact that no absolute seal is possible between the filtrate housing and the solids housing.

Since the centrifugal drum acts like a ventilator during its rotation, an overpressure, which fundamentally effects an exchange of gas between filtrate housing and solids housing, results in the filtrate housing, in which the closed drum rotates during the filtering process, in comparison with the solids housing. The liquid exiting through the openings in the drum casing and through the filter cloth during centrifugation is dispersed in the filtrate housing, i.e. the gas present in this housing is enriched with liquid aerosols which can reach the solids housing via the annular gap. Although an external, so-called "gas-shuttle pipe" is often provided between the filtrate housing and the solids housing and this pipe effects a balancing of pressure between the two housings, an undesired transfer of liquid into the solids housing can, nevertheless, occur via the annular gap as a result of the turbulences prevailing in the filtrate housing. Furthermore, liquid aerosols can, of course, also pass as such into the solids housing via the gas-shuttle pipe, as well as gas saturated with filtered liquid which can then pass in an undesired manner into the solids housing to condensate out.

On the other hand, when the filter cloth is inverted and the solids subsequently removed from this cloth, the base plate bearing the filter cloth is moved into the solids housing like a plunger piston. As a result of this, an overpressure occurs in this housing in comparison with the filtrate housing, at least for as long as the filter cloth still has solids adhering to it and therefore a decrease in pressure cannot take place via the filter cloth. After the filter cloth has been inverted, the dry solids are released into the solids housing. In this respect, the gas in this housing is enriched with solid aerosols by means of dust-like components of the solids. Even when, as already mentioned, a gas-shuttle pipe effecting a balancing of pressure is present, an undesired transfer of solids through the annular gap into the filtrate housing can take place on account of the turbulences prevailing in the solids housing during the release of solids likewise carried out while the centrifugal drum is rotating. Furthermore, solid aerosols can again reach the filtrate housing via the gas-shuttle pipe.

A transfer of filtrate into the solids housing and vice versa of solids into the filtrate housing is extremely undesirable due to the contamination connected therewith but has so far been unavoidable due to the annular gap between centrifugal drum and machine housing, even when the annular gap contains a seal.

The object of the invention is to improve a generic invertable filter centrifuge such that the passage of gaseous, liquid and solid substances between filtrate housing and solids housing, which would impair the purity of the separated products, is reliably prevented in both directions.

This object is accomplished by the invention, in a generic invertable filter centrifuge, in that protection means in the form of blocking gas generating means are provided on the invertable filter centrifuge, with the aid of which a flow of blocking gas effective in two directions can be generated in the annular gap surrounding the edge of the drum, this flow effectively preventing any undesired transfer of gaseous, liquid and/or solid substances in the direction towards the filtrate housing and/or solids housing.

The invention is thus based on the general approach of establishing a pressure difference between the filtrate housing and the solids housing for generating a flow of gaseous medium which precludes any undesired exchange of substances between these housing regions.

In the DE-37 40 411 cited at the outset, an overpressure or underpressure is generated directly in the centrifugal drum and not in the filtrate housing or solids housing. Although the pressure generated in the centrifugal drum can also have an effect in the surrounding filtrate housing, it is not possible hereby to prevent any transfer of gaseous, liquid and/or solid substances between filtrate housing and solids housing.

DE-83 31 079 U1 discloses a centrifuge of a different type (worm centrifuge), in which a blocking gas which is intended to prevent any exit of solids can be applied to a region between the outer centrifugal drum surface and a solids collection housing. The blocking gas is applied with an annular nozzle which has proven to be unfavorable in the case of invertable filter centrifuges. The prevention of foreign substances exiting from a filtrate housing is not described in the cited publication.

The following description of preferred embodiments of the invention serves to explain the invention in greater detail in conjunction with the attached drawings. In these drawings.

Figure 1:
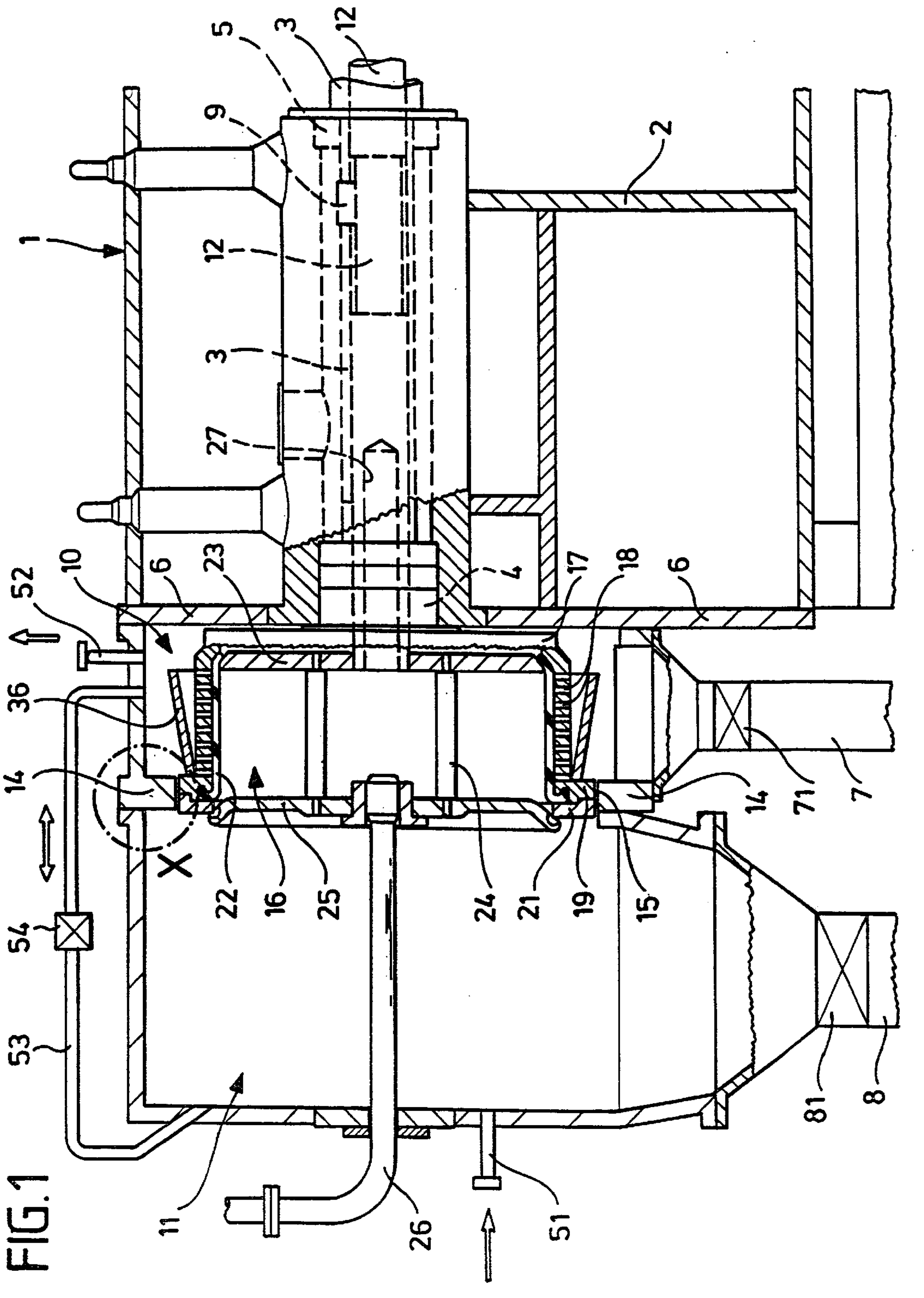
FIG. 1 shows schematically an invertable filter centrifuge with a closed centrifugal drum.
Figure 2:
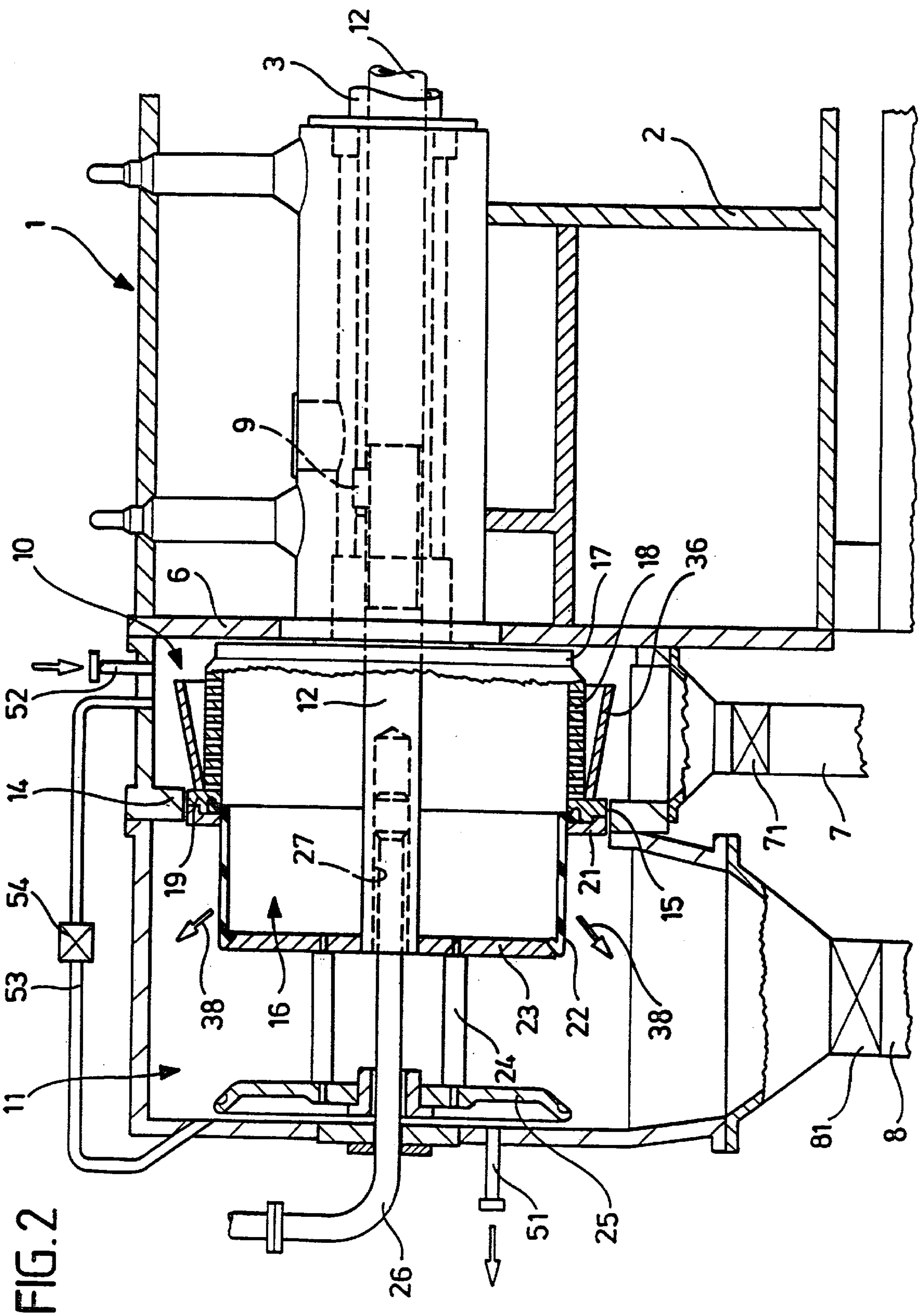
FIG. 2 shows the invertable filter centrifuge from FIG. 1 with an open centrifugal drum.

The invertable filter centrifuge illustrated in FIGS. 1 and 2 comprises a machine housing 1 which is indicated schematically, encloses the drive part of the centrifuge (located respectively to the right in these Figures and not visible) and in which a hollow shaft 3 is rotatably supported on a stationary machine frame 2 in bearings 4, 5. The hollow shaft 3 can be caused to rotate rapidly via a motor (not illustrated). It extends beyond the machine frame 2, the bearing 4 and a partition wall 6, which closes the machine housing 1 at its front side and is sealingly connected to the machine frame 2, and has an axially extending wedge-shaped groove (likewise not illustrated), in which a wedge-shaped part 9 is axially displaceable. This wedge-shaped part 9 is rigidly connected to a shaft 12 displaceable in the interior of the hollow shaft 3. The shaft 12 therefore rotates together with the hollow shaft 3 but is axially displaceable in it.

A pot-shaped centrifugal drum 16 is flange-mounted with its base 17 on the end of the hollow shaft 3 projecting beyond the partition wall 6 so as to be non-rotatable. At its circular-cylindrical side wall the centrifugal drum 16 has radially extending through openings 18. The centrifugal drum 16 is open at its end face located opposite the base 17. The one edge of a filter cloth 22 designed essentially to be circular-cylindrical is sealingly fixed at a flange-like opening edge 19 by means of a holding ring 21. The other edge of the filter cloth 22 is sealingly connected in a corresponding manner to a base plate 23 which is rigidly connected to the displaceable shaft 12 freely penetrating the base 17.

A centrifugal chamber lid 25 is rigidly attached to the base plate 23 via spacer bolts 24, leaving a space therebetween. In FIG. 1, this lid sealingly closes the interior of the centrifugal drum 16 by abutting on its opening edge 19 and in FIG. 2 is lifted freely away from the centrifugal drum 16 together with the base plate 23 as a result of axial displacement of the shaft 12 out of the hollow shaft 3. In FIG. 1, the filter cloth 22 is turned inwards towards the inner side of the centrifugal drum 16, in FIG. 2 this cloth is turned outwards.

Figure 4:
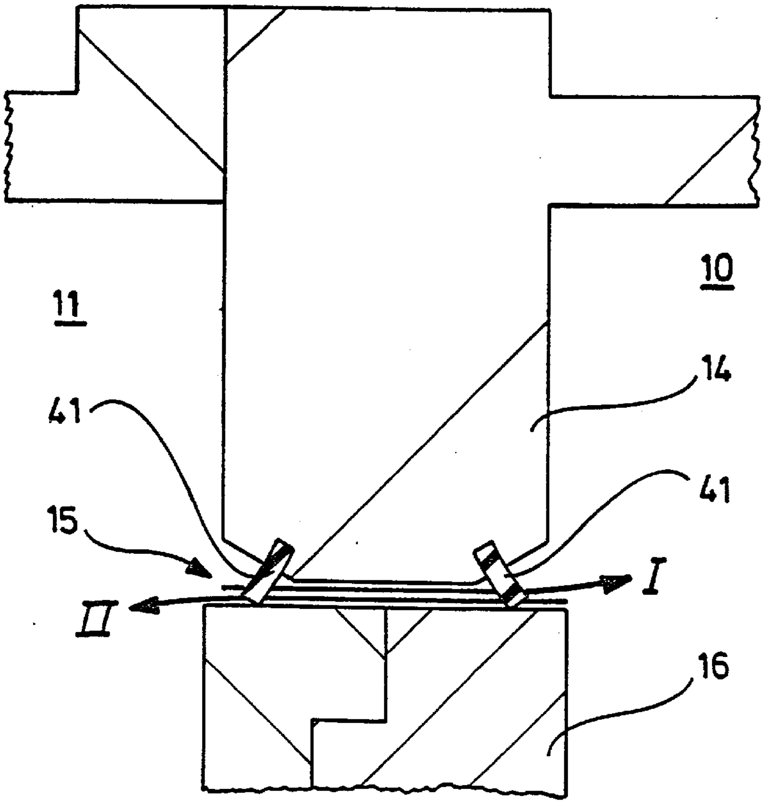

A filtrate housing 10 as well as a solids housing 11 adjoin the machine housing 1 in the region of the centrifugal drum 16. Both housings are sealed off by corresponding walls. In the vicinity of the opening edge 19 of the centrifugal drum 16 the filtrate housing 10 and the solids housing 11 are separated from one another by an annular end wall 14. The opening of this annular end wall 14 surrounds the outer edge of the centrifugal drum 16, leaving an annular gap 15 free. This annular gap is of such a size that the centrifugal drum can carry out smaller wobbling movements at a high rotational speed without touching the inner side of the opening formed in the annular end wall 14. Moreover, seals 41 which are known per se and form as such a complete circle could be arranged in the annular gap 15; these seals consist of elastic, highly flexible material, are inserted into the partition wall 14 and rub loosely on the outer edge of the drum 16 so that this can carry out its wobbling movements to the extent required (FIG. 4).

The filtrate housing 10 serves to receive and discharge a liquid filtrate which has passed through the through openings 18 of the centrifugal drum 16 and the filter cloth 22. In order to discharge the filtrate, a discharge pipe 7 with a check valve 71 is connected to the filtrate housing 10. Following inversion of the filter cloth 22, a filter cake deposited on this cloth and present as solid material can be discharged via a discharge pipe 8 of the solids housing 11, wherein the pipe 8 can be sealinqly closed by means of a check valve 81.

A filler pipe 26, which serves for the supply of a suspension which is to be separated into its solid and liquid components into the interior of the centrifugal drum 16 (FIG. 1) and in the operating state illustrated in FIG. 2 penetrates a bore 27 of the displaceable shaft 12, is arranged on the front side of the invertable filter centrifuge (located to the left in the drawings), wherein the displacement of the shaft 12 and thus the opening and closing of the centrifugal drum 16 takes place via drive motors (not illustrated, located likewise to the right in the drawings), e.g. hydraulically.

During centrifugal operation, i.e. during centrifugation, the invertable filter centrifuge takes up the position illustrated in FIG. 1. The displaceable shaft 12 is withdrawn into the hollow shaft 3, whereby the base plate 23 connected to the shaft 12 is located in the vicinity of the base 17 of the centrifugal drum 16 and the filter cloth 22 is turned inwards into the drum in such a manner that it covers the through openings 18 in its interior. The centrifugal chamber lid 25 thereby abuts sealingly on the opening edge 19 of the centrifugal drum 16. When the centrifugal drum 16 is rotated rapidly, suspension to be filtered is continuously introduced via the filler pipe 26. The liquid components of the suspension pass as filtrate through the filter cloth 22 and the through openings 18 and enter the filtrate housing 10 and are then guided into the discharge pipe 7 connected to the filtrate housing 10 by a baffle plate 36. The solid particles of the suspension are retained by the filter cloth 22 in the form of a filter cake.

When the centrifugal drum 16 continues to rotate—usually more slowly—and after the supply of suspension has been switched off at the filler pipe 26, the shaft 12 is now displaced (to the left) in accordance with FIG. 2, whereby the filter cloth 22 is turned outwards and the solid particles of the filter cake adhering to it are catapulted outwards in the direction of the arrows 38 into the solids housing 11. The components of the filter cake are discharged via the discharge pipe 8.

In the position according to FIG. 2, the filler pipe 26 has penetrated the bore 27 of the shaft 12 as a result of corresponding openings in the lid 25 and the base plate 23, respectively. Once the solid particles forming the filter cake have finally been thrown off under the influence of centrifugal force, the filter centrifuge is brought back into the operating position according to FIG. 1 by returning the shaft 12, whereby the filter cloth 22 is turned back in the opposite direction. In this way, an operation of the centrifuge with a constantly rotating centrifugal drum 16 is possible.

As already mentioned at the outset, the rotating centrifugal drum 16 acts in the filtrate chamber 10 like a ventilator which leads to a pressure gradient directed out of the filtrate housing 10 into the solids housing 11 and thus to a flow of gas out of the filtrate housing 10 into the solids housing 11, whereby undesired substances, in particular liquid aerosols and evaporated liquid, can pass into the solids housing 11 via the annular gap 15. In order to prevent this reliably, means or protection devices are provided in order to achieve a constant gas overpressure in the solids housing 11, with the aid of which a constant flow of a gaseous blocking medium, e.g. air, can be generated through the annular gap, which prevents any undesired transfer of, in particular, gaseous and liquid substances out of the filtrate housing 10 into the solids housing 11. For this purpose, a source of pressure gas (pressure pump), which introduces a gaseous medium, for example, air or an inert gas into the solids housing 11 in the direction of the arrow, is connected, for example, to a short gas inlet pipe 51 provided on the solids housing 11. The overpressure used in the solids housing 11 can be, for example, 5 to 50, preferably 10 to 30 mbars. The filtrate housing 10 has an additional short connection pipe 52 which, in the simplest case, is open to the atmosphere. Thus, a balancing of pressure can take place via the annular gap 15 with the formation of a flow of gas directed accordingly, wherein the flow of gas prevents any transfer of foreign particles out of the liquid housing 10 into the solids housing 11.

When—cf. FIG. 2—the centrifugal drum 16 is opened, the base plate 23 connected to the filter cloth 22 penetrates the solids housing 11 like a plunger piston and generates in it, at least momentarily, a strong overpressure which leads via the annular gap 15 to an exchange of gas out of the solids housing 11 into the filtrate housing 10, wherein undesired foreign substances can again be taken along, namely, in this case, primarily solid aerosols. In order to prevent this, a flow of gas flowing through the annular gap 15 in the opposite direction in comparison with FIG. 1 is generated via the short pipe connections 51, 52—cf. the respectively associated arrows in FIG. 2—, this flow of gas precluding any such undesired transfer of substances. In this case, a source of pressure gas (pressure pump) is connected to the short pipe connection 52 while the short pipe connection 51 can open into the atmosphere. The generation of a slight difference in pressure in the range specified above is again sufficient.

During operation not only in accordance with FIG. 1 but also in accordance with FIG. 2, the check valves 71, 81 in the discharge pipes 7 and 8, respectively, are closed as required.

As shown in FIGS. 1 and 2, the filtrate housing 10 and the solids housing 11 are connected to one another by a "gas-shuttle pipe" 53 running outside the housings and containing, in the illustrated case, a check valve 54. This check valve 54 is missing in the case of known invertable filter centrifuges and so during normal operation with the centrifuge a balancing of pressure between filtrate housing 10 and solids housing 11, namely in both directions, can take place when differences in pressure occur. In this respect, foreign particles can, of course, pass from the one housing into the other housing on account of the missing check valve 54. For this reason, the check valve 54 is provided in the gas-shuttle pipe 53 when an overpressure is to be generated in one of the housings 10 or 11, as described above, for the purpose of avoiding any undesired transfer of foreign substances and is kept closed during the generation of this overpressure.

Figure 3:
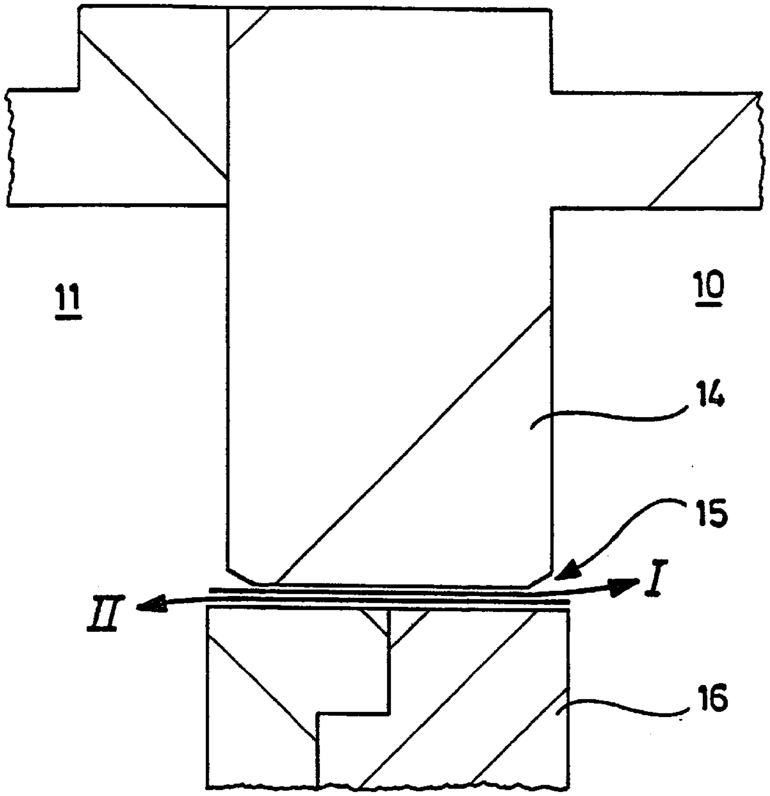
FIGS. 3 and 4 show partial views in the area of the dash-dot circle X in FIG. 1.

To clarify this, the conditions are illustrated again in FIGS. 3 and 4 clearly and schematically. FIG. 3 shows in accordance with the circular area X in FIG. 1 the annular gap 15 between partition wall 14 and the edge of the centrifugal drum 16. In the case of the operating conditions according to FIG. 1, i.e. with a closed centrifugal drum 16, a flow of gas directed into the filtrate housing 10 in the direction of arrow I is generated, wherein air can, for example, serve as blocking medium. When, on the other hand, in accordance with FIG. 2 the solids are catapulted from the inverted filter cloth 22, a flow of gaseous blocking medium through the annular gap 15 in the direction of arrow II is created. The same applies for an annular gap 15 with two sealing strips 41 surrounding the centrifugal drum 16 in a ring shape, as illustrated in FIG. 4.

Instead of connecting pressure pumps to the short pipe connection 51 (FIG. 1) and the short pipe connection 52 (FIG. 2), respectively, the respectively associated short pipe connections 52 and 51 serving to discharge gas can also each be connected to vacuum pipes (suction pumps). This does not alter the mode of operation, namely the generation of a flow consisting of a gaseous blocking medium in the annular gap 15.

Figure 5:
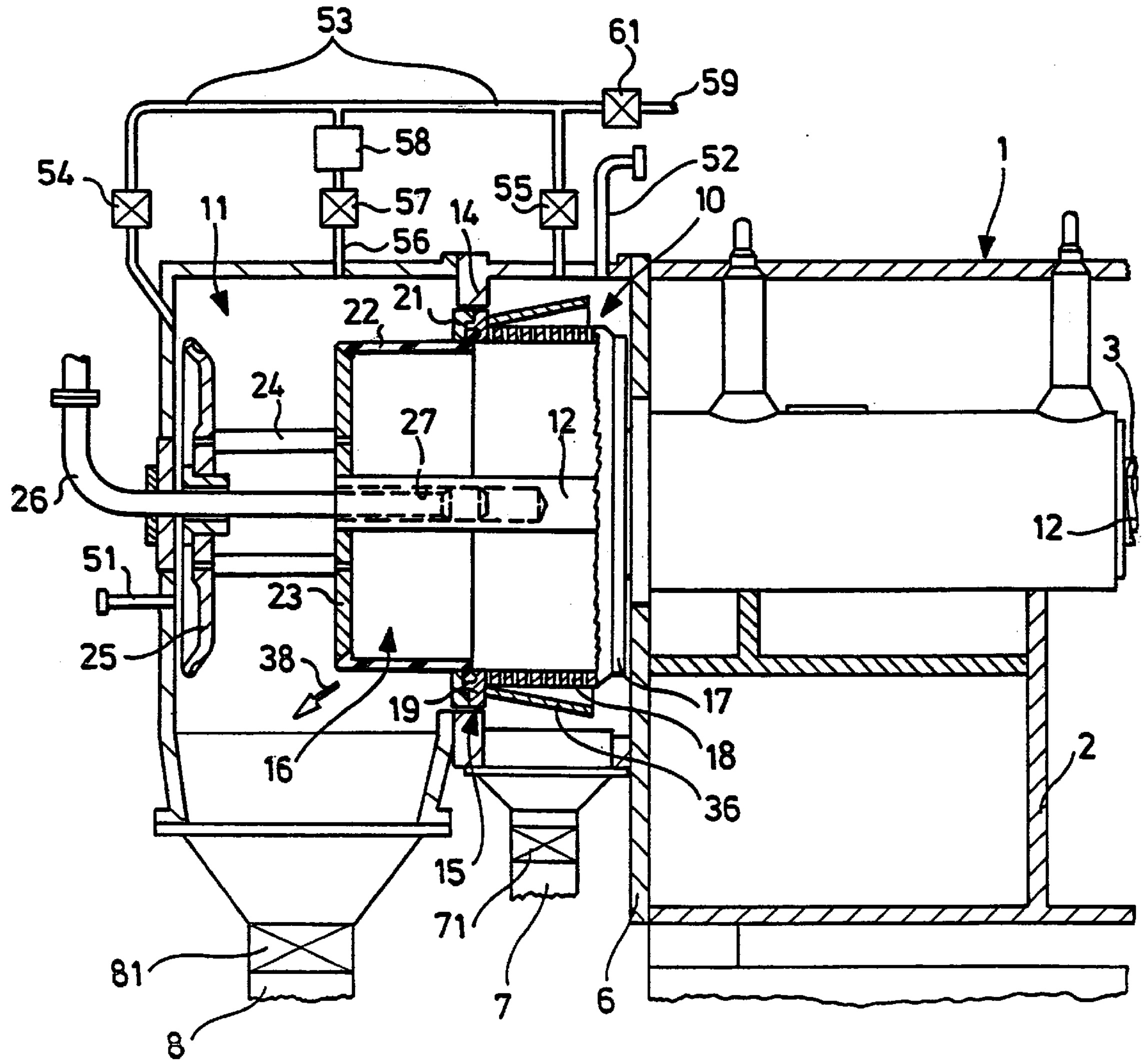
FIG. 5 shows a modified embodiment of an invertable filter centrifuge with an open centrifugal drum.

FIG. 5 shows a modified embodiment of an invertable filter centrifuge, in which, however, only construction and arrangement of the gas-shuttle pipe 53 are altered in comparison with the embodiment according to FIGS. 1 and 2. Apart from the check valve 54 in the gas-shuttle pipe 53, this pipe comprises an additional check valve 55. Moreover, the pipe 53 has an additional branch 56 into the solids housing 11, with an additional check valve 57 and a dust or solids filter 58.

In principle, the invertable filter centrifuge according to FIG. 5 can be operated in the same manner as the invertable filter centrifuge according to FIGS. 1 and 2. When, however, during the discharge of solids, i.e. with an open centrifugal drum 16 (FIG. 5), the blocking medium flows through the annular gap 15 in the direction from the filtrate housing 10 to the solids housing 11, it may be favorable to close the two check valves 54 and 55 as well as, in addition, to sealingly block the short pipe connection 51 so that no gas can exit from it. In this case, the check valve 57 is then opened. The gaseous blocking medium supplied via the short pipe connection 52 flows out of the filtrate housing 10 via the annular gap 15 into the solids housing 11, from there via the opened check valve 57 into the dust filter 58 where solid particles are retained and, finally, via the gas-shuttle pipe 53 into an exhaust gas pipe 59. The exhaust gas pipe 59 can contain a pressure-maintaining valve 61 which serves to maintain a certain pressure in the entire system.

As already explained, the flow of the gaseous blocking medium in the annular gap 15 can be generated in the desired direction either as a result of overpressure or as a result of a vacuum in one of the chambers forming the filtrate housing or the solids housing. Combinations of overpressure and underpressure in these chambers are also possible.

The gas discharged out of the solids housing 11 via the exhaust gas pipe 59 can be reprocessed. When a flow of blocking gas in the opposite direction is used, i.e. the gas is not drawn out of the solids housing 11 but out of the filtrate housing 10, the valve 55 is opened—with valves 54, 57 closed—and the gas likewise introduced into the exhaust gas pipe 59 for the purpose of reprocessing. In this case, the gas can be introduced, for example, into the solids housing 11 via the short pipe connection 51, wherein the short pipe connection 52 is sealingly closed.

Figure 6:
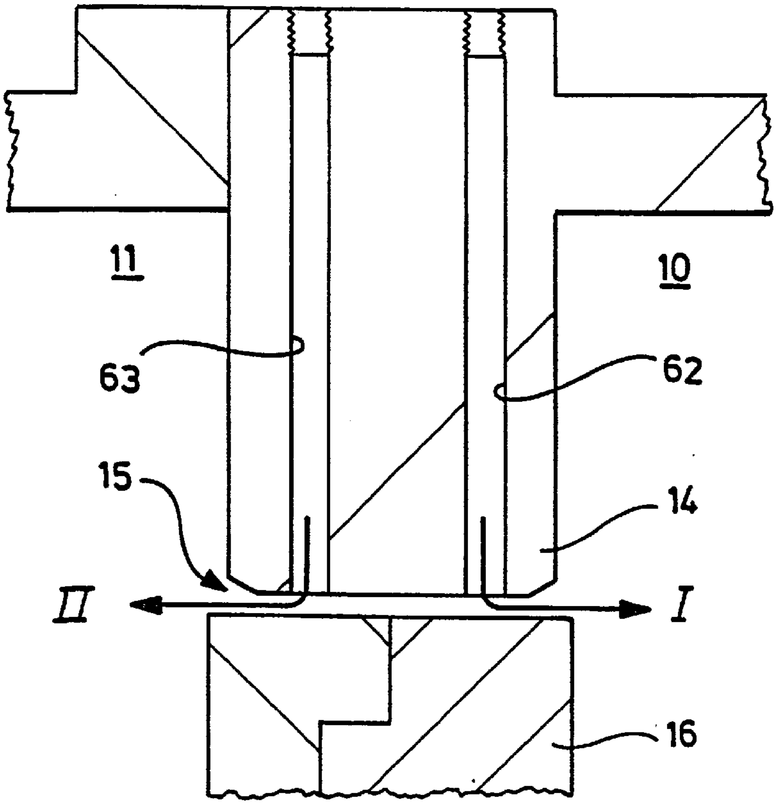
FIGS. 6 and 7 show partial views of modified embodiments of invertable filter centrifuges in the area of the dash-dot circle X in FIG. 1

Instead of introducing the gaseous blocking medium either into the filtrate housing 10 or the solids housing 11 by forming a corresponding pressure gradient, it can also be supplied directly to the annular gap 15 and from there be deflected directly into the relevant housing chamber. It is particularly favorable when the supply of gas is introduced, in accordance with FIG. 6, not only into the filtrate housing 10 but also into the solids housing 11 and as a result a double sealing effect is achieved in relation to the passage of foreign particles. FIG. 6 shows schematically two gas supply pipes 62, 63 for this purpose in the partition wall 14. In practice, numerous such pipes 62, 63 run radially within the partition wall 14, e.g. proceeding from a common annular pipe, and open in the annular gap 15 where they generate the desired flows of blocking gas in the directions I and II, respectively. The annular pipe is connected to a source of gas (pump) (not illustrated).

Figure 7:
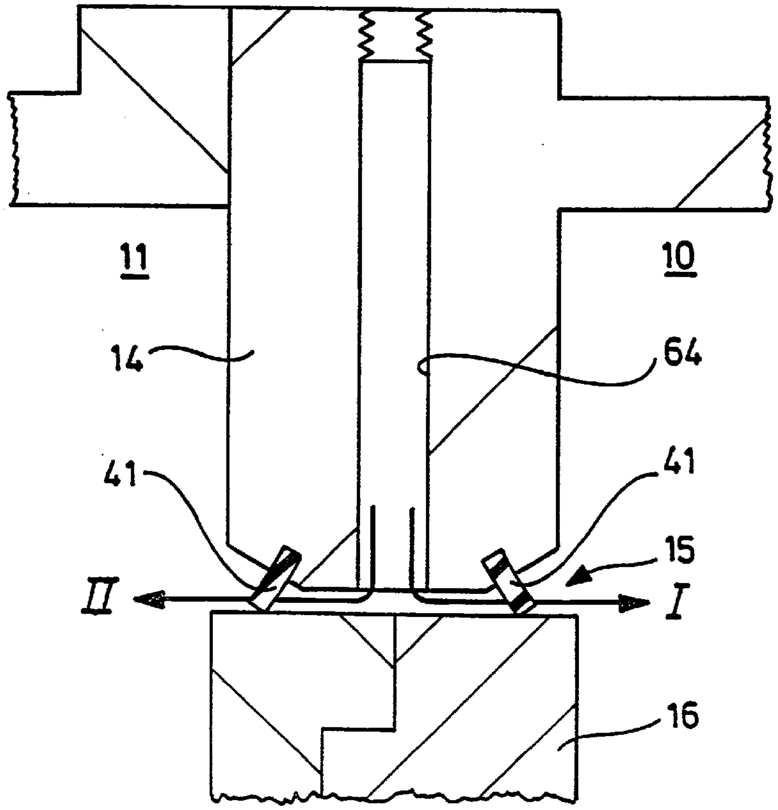

In the case of the modified embodiment according to FIG. 7, only one single pipe 64 is provided in the partition wall 14 instead of the two pipes 62, 63 and this pipe can again be conceived, for example, as a radial branch from an annular pipe surrounding the centrifugal drum 16 and connected to a pump. In this case, the two flows of the blocking medium in the directions I and II respectively proceed from a single opening in opposite directions.

The annular gap 15 in FIG. 7 again contains two annular sealing strips 41 which surround the drum 16 and are attached in the partition wall 14. The introduction of the blocking medium via the pipe 64 takes place between the sealing strips 41. It is also possible not to direct the introduction of the gaseous blocking medium into the annular gap 15 in accordance with FIGS. 6 and 7 in both directions I and II but either only in the direction I or only in the direction II depending on the operational state of the invertable filter centrifuge.

The flows of gas illustrated in FIGS. 6 and 7 and flowing in the directions I and II can be generated either as a result of overpressure in the pipes 62, 63, 64 or also as a result of a vacuum in the respective chambers receiving the flows, namely in either the filtrate housing 10 or the solids housing 11.

Figure 8:
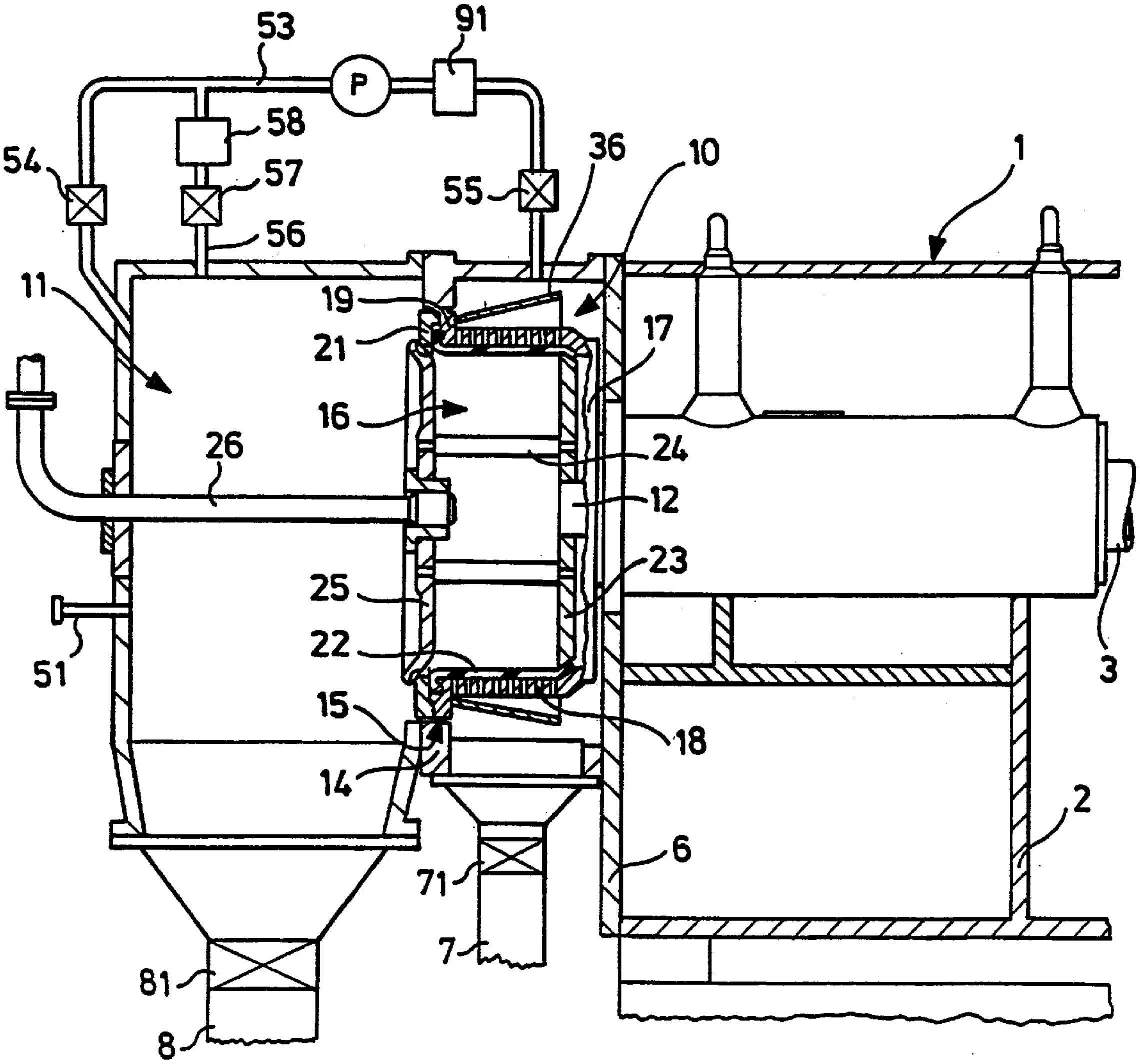
FIG. 8 shows a further modified embodiment of an invertable filter centrifuge with a closed drum.

Finally, FIG. 8 shows a last embodiment of an invertable filter centrifuge. When it is admissible with respect to industrial processing and safety technology as well as appears to be expedient from the point of view of costs, the pressure gradient required for the flow of blocking gas can also be realized without any additional feeding of gas, as described in the preceding embodiments. As shown in FIG. 8, a suction pump P can, for example, be switched into the gas-shuttle pipe 53; this suction pump withdraws gaseous medium from the filtrate housing 10 via a liquid separator 91 and the opened check valve 55, feeds it into the solids housing 11 when check valve 57 is closed and check valve 54 opened and thus maintains a constant, self-contained flow of blocking medium through the annular gap 15 (arrow I in FIGS. 3 and 4). The short pipe connection 51 is, in this case, closed.

During discharge of the solid matter, i.e. with an opened centrifugal drum, a flow of gas is generated in the opposite direction (arrows II in FIGS. 3 and 4) likewise with the aid of a pump P arranged in the pipe 53.

The invention could also be formulated as a process, for example, in the sense that a flow consisting of a gaseous blocking medium is generated in the annular gap 15 and this prevents any transfer of foreign substances between filter housing and solids housing 10, 11.

I claim:

1. An invertable filter centrifuge for separating liquid-solids mixtures comprising a rotatingly driven centrifugal drum, an invertable filter cloth arranged on the centrifugal drum, a filtrate housing for receiving and discharging the liquid filtrate separated from the liquid-solids mixture by means of centrifugation with a filter cloth turned inwards into the centrifugal drum, a solids housing for receiving and discharging the solids separated from the liquid-solids mixture during further rotation of the centrifugal drum with a filter cloth turned outwards and an annular gap surrounding the edge of the centrifugal drum in the area of the filtrate housing and the solids housing, wherein blocking gas generating means are provided on the invertable filter centrifuge, a flow of blocking gas effective in two opposing directions being generatable in the annular gap surrounding the edge of the drum with the aid of said blocking gas generating means, said flow effectively preventing any undesired transfer of gaseous, liquid and/or solid substances in the direction towards the filtrate housing and/or solids housing.

2. The invertable filter centrifuge of claim 1, wherein the blocking gas generating means comprise a pump.

3. The invertable filter centrifuge of claim 2, wherein the pump is connected to the filtrate and solids housings via pipe and control means and optionally generates overpressure in one of these housings so that the blocking gas flows through the annular gap into the respectively other housing.

4. The invertable filter centrifuge of claim 2, wherein the pump is connected to the annular gap surrounding the edge of the drum via pipe and control means and generates the flow of blocking gas directly in said gap.

5. The invertable filter centrifuge of claim 4, wherein the pump generates two flows of a blocking gas in the annular gap, one of said flows being directed into the filtrate housing and the other into the solids housing.

6. The invertable filter centrifuge of claim 1, wherein the blocking gas is air or an inert gas.

7. The invertable filter centrifuge of claim 1, wherein a seal is arranged in the annular gap between the edge of the rotating centrifugal drum and a stationary machine housing part.

8. The invertable filter centrifuge of claim 1, wherein an exhaust gas pipe is provided, the blocking gas flowing out of the filtrate housing or solids housing being introduceable into said pipe.

9. The invertable filter centrifuge of claim 8, wherein the exhaust gas pipe contains a pressure-maintaining valve.

10. The invertable filter centrifuge of claim 1, wherein a gas-shuttle pipe with a check valve is provided between filtrate housing and solids housing.

11. The invertable filter centrifuge of claim 10, wherein the pump is arranged in the gas-shuttle pipe.

12. The invertable filter centrifuge of claim 2, wherein the pump is arranged in the gas-shuttle pipe.

13. The invertable filter centrifuge of claim 1, further comprising a solids filter for the flow of blocking gas exiting from the solids housing.

14. The invertable filter centrifuge of claim 1, further comprising a liquid separator for the flow of blocking gas exiting from the filtrate housing.

* * * * *